US009807646B1

(12) United States Patent
Jorgavanovic

(10) Patent No.: US 9,807,646 B1
(45) Date of Patent: Oct. 31, 2017

(54) DETERMINING NOISE LEVELS IN ELECTRONIC ENVIRONMENTS

(71) Applicant: Amazon Technologies, Inc., Reno, NV (US)

(72) Inventor: Milos Jorgavanovic, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/859,971

(22) Filed: Sep. 21, 2015

(51) Int. Cl.
*H04W 28/00* (2009.01)
*H04W 28/04* (2009.01)
*H04L 5/00* (2006.01)
*H04L 12/801* (2013.01)

(52) U.S. Cl.
CPC .......... *H04W 28/048* (2013.01); *H04L 5/006* (2013.01); *H04L 47/29* (2013.01)

(58) Field of Classification Search
None
See application file for complete search history.

(56) References Cited

U.S. PATENT DOCUMENTS

2014/0348004 A1\* 11/2014 Ponnuswamy ......... H04L 1/203
370/242

\* cited by examiner

*Primary Examiner* — Alex Skripnikov
(74) *Attorney, Agent, or Firm* — Hogan Lovells US LLP

(57) ABSTRACT

Various approaches discussed herein enable establishing a wireless data connection between one or more devices. A signal to noise ratio (SNR) is determined for the wireless connection, based on an estimate of internal noise associated with a wireless networking component. Another SNR determination is then made, using data such as a Modulation and Coding Scheme (MCS) index value corresponding to the connection, and the difference between the two SNR determinations may be utilized to determine a noise estimate that takes both internal and external noise into account and is utilized as part of baseband signal demodulation.

20 Claims, 7 Drawing Sheets

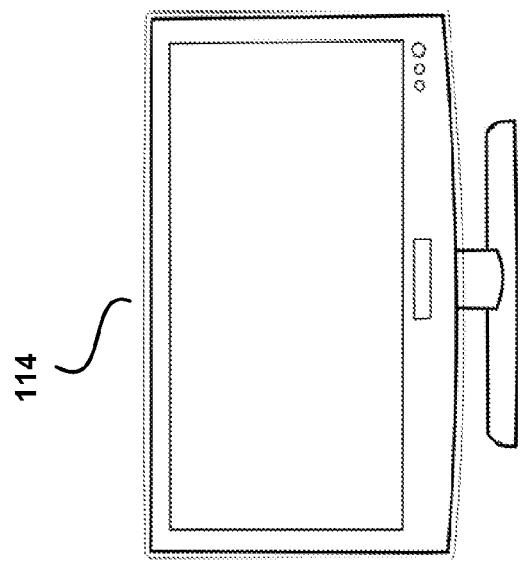
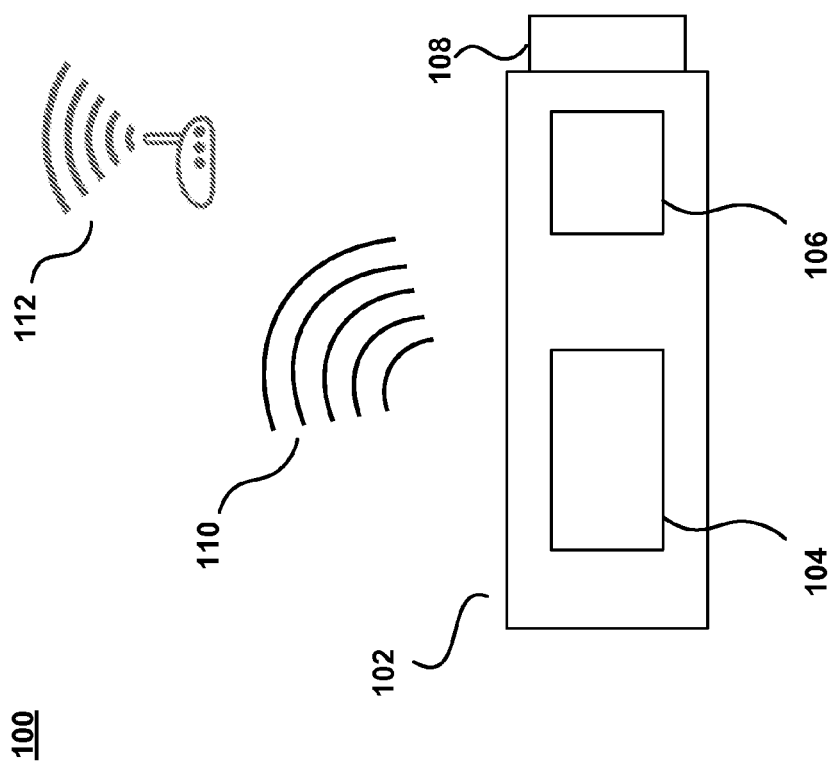
FIG. 1

FIG. 2
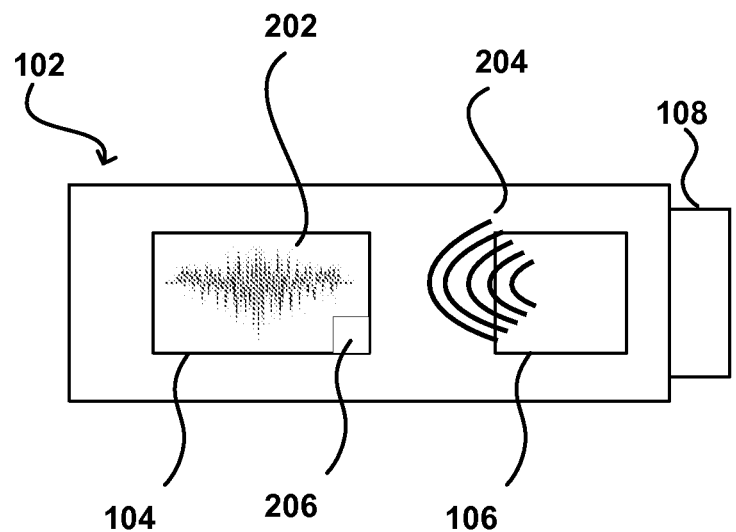
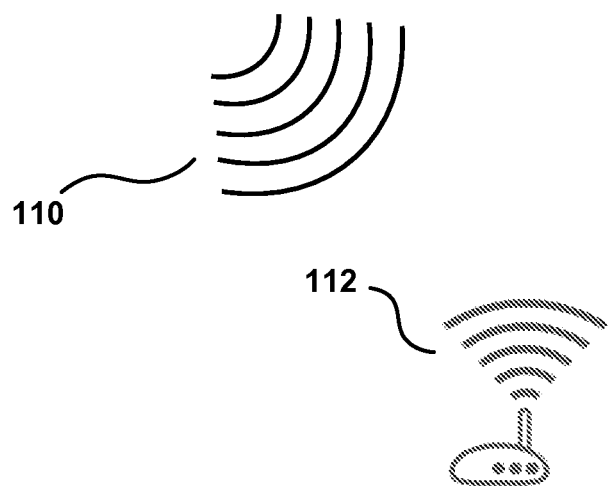

DETERMINING NOISE LEVELS IN ELECTRONIC ENVIRONMENTS

BACKGROUND

People are increasingly utilizing wireless communication technologies to transmit data between electronic devices, and these electronic devices may contain multiple electronic components performing different functions, often placed closely together in a confined space. Each of these electronic components may affect performance of the other electronic components; for example, due to various factors such as inherent signal noise, poor shielding, etc., one electronic component of the device, for example provided by one manufacturer, may introduce interference that other electronic components of the device, for example provided by a different manufacturer, are not designed to detect and/or compensate for, resulting in degraded performance or inoperability.

BRIEF DESCRIPTION OF THE DRAWINGS

Various embodiments in accordance with the present disclosure will be described with reference to the drawings, in which:

FIG. 1 illustrates an example of a wireless-enabled device, such as a media streaming device, communicating wirelessly with a wireless access point, in accordance with various embodiments;

FIG. 2 illustrates an example of a wireless-enabled device, such as a media streaming device, with multiple components generating signal noise and/or interference, in accordance with various embodiments;

DETAILED DESCRIPTION

Figure 3:
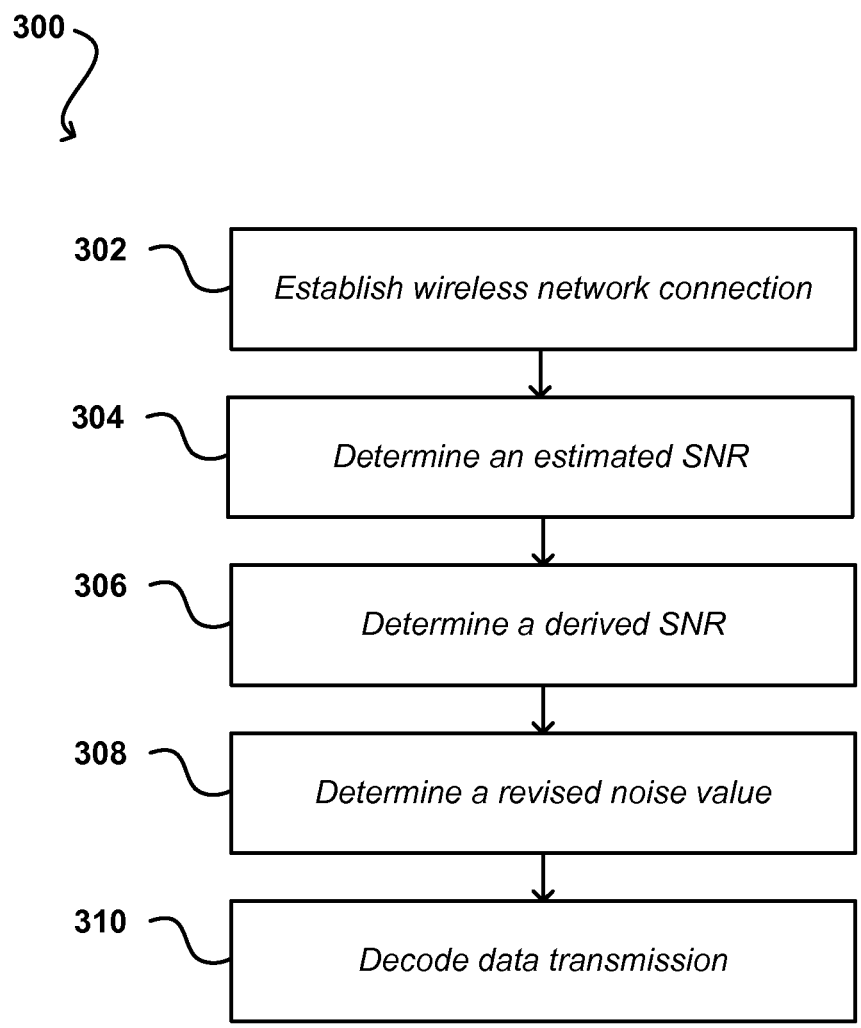
FIG. 3 illustrates an example process for determining noise levels used in decoding wireless transmissions, in accordance with various embodiments.

Systems and methods in accordance with various embodiments of the present disclosure may overcome one or more of the aforementioned and other deficiencies experienced in conventional approaches for wireless communication where multiple sources of electronic or other noise may affect data transmission. In particular, various embodiments enable a device, such as a wireless-enabled device, to receive and transmit data, for example to another wireless-enabled device, with an accurate estimate of both internal and external noise being utilized in signal demodulation.

Various approaches discussed herein enable establishing a wireless data connection between one or more devices, for example between a wireless access point and a wireless network component of a device such as a media streaming device, where the device may have multiple components alongside the wireless network component in a small space, each component capable of generating electronic noise. A signal to noise ratio (SNR) is determined for the wireless connection, based on the wireless network component's reported and/or stored (e.g., default) estimate of its internal noise (e.g., thermal noise). Another SNR determination is then made, using data such as a Modulation and Coding Scheme (MCS) index value corresponding to the connection, and the difference between the two SNR determinations may be utilized to determine a noise estimate that takes both internal and external noise into account. A noise difference value is then determined, which in various embodiments is stored in a register at the wireless network component, and when added to the wireless network component's reported and/or stored (e.g., default) estimate of its internal noise, results in proper and accurate baseband signal demodulation because the accurate noise estimate may be used to determine a proper SNR to use in the receiver chain. In various embodiments, a determination of whether a threshold value of the difference between the SNR values has been exceeded may be utilized, for example to pause an iteration of the disclosed techniques, or choose a time interval for each iteration.

Accordingly, approaches in accordance with various embodiments improve the operation and performance of the computing device(s) on which they are implemented and with which they communicate wirelessly by, among other advantages, maximizing efficiency and reliability of wireless communications by accurately determining internal and external noise and utilizing the determination in signal demodulation. Various other applications, processes, and uses are presented below with respect to the various embodiments, each of which improves the operation and performance of the computing device(s) on which they are implemented.

FIG. 1 illustrates an example 100 of a wireless-enabled device 102, such as a media streaming device, communicating wirelessly 110 with a wireless access point 112, in accordance with various embodiments, although other devices are envisioned as communicating wirelessly with wireless-enabled device 102, such as modems, bridges, repeaters, consumer electronics such as a television 114, computing components, etc. In an embodiment, wireless-enabled device 102 may have a wireless network component 104, such as a Wi-Fi chip, cellular communications device, Bluetooth device, or other wireless communication device that is a component of wireless-enabled device 102, for example by being a chipset from a particular vendor. While one or more antennas are not separately illustrated in FIG. 1, it should be understood that wireless network component 104 represents all components necessary for wireless communications of any type, and that various other components utilized in wireless data communication may be communicatively coupled to wireless network component 104 as appropriate.

In the example of FIG. 1, and as used throughout this disclosure, Wi-Fi is an example of a wireless communication technology capable of being utilized with the approaches described herein. Those of ordinary skill in the art will appreciate that the systems and methods described herein apply to a variety of other hardware and software devices and wireless communication technologies across a variety of computing devices, peripherals, components and the like. Other examples of wireless communication technologies which may be utilized in concert with the approaches described herein may include Wi-Fi, Bluetooth, Bluetooth Low Energy (Bluetooth LE), 802.15.4 family of standards, such as ZigBee, and/or any other wireless transmission technology currently in use or developed in the future, wherein for example the communications occupy a particular frequency band (e.g., 2.4 GHz, etc.), and wherein components generating, transmitting, and/or receiving these signals are capable of interfering with each other, such that transmission performance may be degraded or impossible.

In the example of FIG. 1, wireless-enabled device 102 may encompass a variety of connectors 108; for example, VGA, DVI, HDMI, USB, etc. According to an embodiment, wireless-enabled device 102 is capable of utilizing wireless network component 104 to obtain audio and/or video data; for example, a media streaming device that wirelessly downloads, or streams, audio/video data from a source, such as the Internet or a network-connected storage device, and then communicates that audio/video data to one or more output devices, such as television 114, as well as monitors, speaker systems, etc. According to an embodiment, wireless-enabled device 102 comprises a media streaming component 106, which in various embodiments may comprise a chipset capable of encoding/decoding audio/video data and causing the audio/video data to be transmitted to one or more of the aforementioned output devices, for example utilizing the wireless network component 104 or a connector 108, such as an HDMI connector.

In the example of media streaming component 106 causing audio/video data to be communicated over connector 108, wireless-enabled device 102 may be plugged into the output device such as a television 114 via connector 108, and audio/video data may be obtained wirelessly 110 by wireless network component 104, for example by establishing a wireless connection 110 with wireless access point 112 or other device connected to and capable of uploading and downloading data over an Internet connection. This audio/video data is then communicated, for example from wireless network component 104 that received the data, to media streaming component 106, which may perform transformation of the data, for example encoding/decoding the data to or from one format to another, preparing the data for transmission to a particular output device, etc. The data is then communicated from media streaming component 106 to the output device 114, for example over connector 108.

FIG. 2 illustrates an example 200 of a wireless-enabled device, such as a media streaming device with multiple internal components, one or more of which are generating signal noise and/or interference, in accordance with various embodiments. It should be understood that reference numbers are carried over between figures for similar components for purposes of explanation, but that such use should not be interpreted as a limitation on the various embodiments.

In the example of FIG. 2, wireless-enabled device 102 has two internal components, wireless network component 104 and media streaming component 106. For purposes of FIG. 2, wireless network component 104 and media streaming component 106 are the only discrete internal components illustrated, although additional components are envisioned, one or more of which may be communicatively coupled to wireless network component 104 and/or media streaming component 106. One drawback to assembling multiple electronic components in a small package, where at least one of those components is operable to perform wireless data transmission, is that various factors related to the density of the components may result in degradation of wireless data transmission. For example, interference may be generated by one or more of the electronic components, for example due to inadequate shielding, asymmetric transmission lines, pin length, and/or noise, and as a result, wireless data transmission may be impacted.

For example, a component such as media streaming component 106 and/or connector 108, as a result of transmitting electronic signals from one component to the other, may generate various types of noise, which is a random fluctuation in an electrical signal. For example, thermal noise is electronic noise generated by thermal agitation of charge carriers (e.g., electrons) inside an electrical conductor at equilibrium, which happens regardless of any applied voltage. While thermal noise is unavoidable at non-zero temperature, other types of noise, such as conductance fluctuations, 1/f noise, etc., may be caused by the operation of various electronic components in wireless-enabled device 102. For purposes of wireless-enabled device 102, two sources of noise may be considered for each component: internal noise 202 (e.g., noise internal to a component such as thermal noise) and external noise 204 (e.g., noise emanating externally from a component, such as because of transmission of electronic signals).

Wireless network component 104 is particularly susceptible to the effects of external noise 204. Wireless network component 104 may be communicatively coupled to one or more antennas (internal and/or external to the component), which are used to collect energy (e.g., radio frequency (RF) signals). Any sources of external noise 204 that are proximate to wireless network component 104 and/or its antennas can cause desense, a degradation of sensitivity due to noise sources, and thereby affect proper demodulation of a baseband signal, as discussed herein. In the case of an HDMI component, for example, external noise may be generated by the HDMI lines, PCB tracings, the PCB itself, various connectors, cables connected to the HDMI component, etc. Other external noise may be interference caused by proximate devices, such as a microwave operating nearby, or cordless telephones, etc.

Because wireless network component 104 is affected by noise, vendors of wireless chipsets perform extensive testing to determine various levels of internal noise 202 caused for example by operation of wireless network component 104. This is useful because wireless data processing (e.g., demodulation, etc.) is dependent upon an accurate estimation of a signal to noise ratio (SNR) of a wireless connection. SNR is the difference in decibels between a received signal and a background noise level (e.g., noise floor). SNR directly impacts wireless network performance. Higher SNR values means that signal strength is stronger in relation to the noise level, which allows for more complex modulation techniques, resulting in higher data rates and fewer retransmissions. As SNR declines, so do data rates and throughput. For example, if wireless network component 104 receives a signal of −75 dBm and the noise floor is measured at −95 dBm, the SNR is 15 dB. Data corruption and therefore re-transmissions may occur if the received signal is too close to the noise floor, and in wireless networks such as 802.11, re-transmissions adversely affect throughput and latency.

Through testing, wireless network component vendors model and pre-compute the internal noise inherent in operation of the wireless network component so that the estimate may be used in SNR calculations, which are then used as part of wireless data transmission (e.g., baseband signal demodulation, such as decoding data transmissions from a wireless access point). Wireless network component 104 may have multiple configurations, for example for one or more low noise amplifiers (LNA) used to receive and transmit wirelessly. Depending on the configuration, various gain settings may be optimal, which in turn affect the noise floor estimate (i.e., internal noise) reported by the wireless networking component. For example, with a high gain setting, the noise floor will go up, and vice versa. Components such as wireless network component 104 have data allowing for an accurate estimation of internal noise 202 caused by such settings, which results in a noise floor determination.

The noise floor estimate is reported by and/or stored at wireless network component 104 and used in calculating a SNR, as discussed above. In an example, the noise floor value is compared to (e.g., subtracted) from the signal strength, which may be based on a received signal strength indicator (RSSI) value corresponding to a wireless network connection 110. An RSSI value may be measured by wireless network component 104 and/or wireless access point 112, and data indicating the RSSI may be transmitted with the wireless network connection 110.

While determination of internal noise 202 for a component such as wireless network component 104 is known, external noise 204 is dependent on numerous factors outside the control of a wireless chipset vendor. For example, external noise sources may be caused by proximity of components, improper shielding, etc. Because space is at a premium in compact media streaming devices for example, it is not feasible for wireless chipset vendors to incorporate mechanisms to measure external noise 204 that may affect wireless data transmission; however, the disclosed techniques improve the operation of an electronic system in which wireless network component 104 is used by providing techniques to accurately estimate external noise and compensate for it.

For example, a Wi-Fi chip receiving a wireless signal from an access point, without any external noise influence, will be able to determine an accurate SNR estimate, because the noise floor used in the SNR calculation should be close to the actual value. As a result, the receiver chain in the Wi-Fi chip will perform adequate signal processing due to the accurate SNR determination. In an example where external noise exists proximate to the Wi-Fi chip, such as the example of FIG. 2, then the actual noise floor increases (e.g., accounted-for thermal noise plus the non-accounted-for external noise) without the Wi-Fi chip being aware of the external noise. As a result, the estimated SNR may be inaccurate; rather than the SNR the Wi-Fi chip calculates based solely on the internal noise, the actual SNR will likely be lower due to the real noise being higher (i.e., internal and external noise).

In an embodiment, the SNR estimate determined by the wireless network component 104 is used by the receiver chain (e.g., demodulation chain) to decode messages (e.g., baseband signal demodulation), for example by setting various filters and other signal processing blocks in the receiver chain to do signal processing based on the chip's incorrect SNR estimate. In various embodiments, the Wi-Fi receiver chain uses an SNR estimate at the demodulation input as well as with regard to the various filters. Because of the incorrect SNR estimate, wireless transmission is negatively impacted; for example, dropped packets, lower throughput, higher error rate, etc. The decoding and/or demodulation process may be based on the SNR estimate, for example, because the baseband uses RSSI and the internal noise value (provided by the Wi-Fi component, for example) to determine a SNR value. In various embodiments, this SNR is used to determine a confidence and/or probability associated with demodulating and decoding. If the SNR is fairly high (e.g., 20 dB), then a high confidence/probability is associated with the demodulated data; i.e., that the demodulated data is correct. If the SNR is low (e.g., 2 dB), then a demodulator may associate a lower confidence/probability to the demodulated data; i.e., less likely that the demodulated data is correct. This confidence and/or probability make take many forms known in the art. The demodulated data and the associated confidence/probability is then passed to a decoder that may not use the SNR values directly, but uses the confidence/probability received from the demodulator, for example by setting various filters and other signal processing blocks. The techniques described herein provide for a more accurate estimation of various data such as SNR, which improves the operation of the system by reducing the chance of errors introduced by incorrect estimation of noise values and SNR, which leads to demodulation and decoding errors.

As an example, if a Wi-Fi chip estimates SNR to be 20 dB, due to only accounting for internal noise, while external noise causes the actual SNR to be 5 dB, then the MCS number will be low. The Wi-Fi chip will be attempting to decode messages sent based on the low MCS, but will be performing the decoding with a SNR that is not set accordingly; i.e., not based on the actual SNR. As a result, performance can be degraded, which then results in an even lower MCS number (e.g., due to access point rate adaptation techniques), and transmission problems are compounded.

As part of a wireless network connection 110, for example between wireless network component 104 and wireless access point 112 in the example of FIG. 2, a Modulation and Coding Scheme (MCS) index value corresponding to the connection 110 may be transmitted, for example from wireless access point 112 to wireless network component 104. A MCS index value (i.e., MCS number) can be used to determine a likely data rate of a Wi-Fi connection. The MCS value essentially summarizes the number of spatial streams, the modulation type and the coding rate that is possible when connecting the wireless access point. Because Wi-Fi chipsets use a rate adaptation method to select an MCS number based on the estimated SNR (among other parameters), the MCS number may be utilized as part of a technique to determine an actual SNR of a Wi-Fi connection. Because of a rate adaptation mechanism, a lower MCS number indicates a lower SNR, while a higher MCS number indicates a higher SNR. An MCS number is negotiated between a Wi-Fi client and Wi-Fi access point based on actual channel conditions (e.g., signal strength, interference, etc.).

According to an embodiment, a MCS lookup table may be employed; for example, mapping data that correlates SNR to MCS can be used to determine an actual SNR of a wireless connection. Once the MCS number is known, then an accurate estimate of the actual SNR may be determined, which takes internal and external noise into account. An example of a portion of such mapping data is provided in Table 1; however, varying embodiments of such mapping data may be utilized, wherein the mapping data includes more or fewer categories of data related to a wireless connection, such as wireless protocol, channel, channel strength, MCS number, data rate, modulation scheme, throughput, number of retransmissions, etc. The MCS lookup table may be created by a vendor, for example during chipset evaluation in which exacting measurements are able to be performed. The MCS mapping data may reflect a MCS number-to-SNR relationship where there is no external noise (e.g., an exact relationship). The MCS lookup table may be accessible from chipset firmware, for example.

TABLE 1

| SNR (dB) | MCS Number |
|---|---|
| 3 | 2 |
| 4 | 3 |
| 5 | 4 |
| 6 | 5 |

Turning back to the example given above, where a Wi-Fi chip estimates SNR to be 20 dB, due to only accounting for internal noise, while external noise causes the actual SNR to be 5 dB, according to an embodiment, a register 206 or similar capability may exist in which a "bias value" may be written, which is added to the noise floor estimate (e.g., −95 dBm) generated by the wireless network component 104, resulting in a more accurate SNR estimate. In the example, the SNR estimate of 20 dB only takes into account the internal (e.g., thermal) noise generated by the wireless network component 104, and not any additional external noise (e.g., generated by media streaming component 106 and/or connector 108, or another component that may be internal or external to wireless-enabled device 102). A wireless connection 110 is established between wireless network component 104 and wireless access point 112, and the MCS number negotiated between wireless network component 104 and wireless access point 112 is 4, for example. The MCS mapping data (e.g., Table 1, above), which may be stored at or otherwise accessible (e.g., via an external device or a network) to wireless network component 104 is analyzed, and it is determined that an MCS number of 4 corresponds to an SNR of 5 dB. In order to cause wireless network component 104 to utilize a more accurate SNR (e.g., one that takes external noise into account), a value of 15 dB is written (e.g. stored) into the bias value register. The wireless network component 104 uses this value to add to the noise floor, which results in the wireless network component 104 estimating the SNR at 5 dB. In various embodiments, one or more bias value registers may be used, and may be user-accessible or modifiable via firmware, as well as being a non-physical register or some other form, residing in one or a number of components, or even being external to the device, for example on a server, accessible to the device over a network connection.

As used throughout this disclosure, a "bias value register" is just one example of hardware or software settings that may be adjusted to achieve different performance effects in computing systems, and described in detail for illustrative purposes. Those of ordinary skill in the art will appreciate that the systems and methods described herein apply to a variety of other hardware and software settings across a variety of computing devices, peripherals, components and the like.

FIG. 3 illustrates an example process 300 for determining noise levels used in decoding wireless transmissions, in accordance with various embodiments. Although this figure, and FIG. 4 below, may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In this example, a wireless network connection is established 302, for example between a wireless networking component (e.g., Wi-Fi chip, etc.) and a wireless access point (e.g., a wireless router, wireless modem, etc.). According to an embodiment, the wireless networking component is part of a device, such as that illustrated in the examples of FIGS. 1 and 2, wherein the wireless networking component is one component of several, each disposed proximately within an enclosed space. For example, an HDMI component (e.g., a video processing chip, one or more connectors, etc.) may be included in the device, and as discussed herein, be a source of electronic noise with which the techniques described herein address. While HDMI is used as an example, it should be understood that any component that emanates electronic noise, especially that which is more or less constant in time, leading to the previously-described problems and disadvantages may be addressed according to the techniques described herein.

An estimated SNR value corresponding to the wireless network connection is determined 304 by the wireless networking component. The estimated SNR value is based on at least two factors. One is an initial noise value (e.g., a "noise floor" or internal noise value) as reported by the wireless networking component, and as described earlier. This noise floor may be considered a default value of the wireless network component, and may depend on several factors, such gain settings or other parameters associated with components of the wireless network component, such as a low noise amplifier (LNA). This noise floor only takes into account the internal noise generated by operation of the wireless network component. Another factor is a received signal power value, typically represented through an RSSI value associated with the wireless network connection, which may be determined through, for example, an analysis of parameters transmitted with the wireless network connection from the wireless access point. Once an RSSI and a noise value are determined, then the estimated SNR may be calculated, for example: $SNR_{estimate}=(RSSI-N_{internal})$, where $N_{internal}$ is the initial noise value (e.g., the default noise floor value associated with and/or reported by the wireless networking component.

A derived SNR corresponding to the wireless network connection is then determined 306 by the wireless networking component. The derived SNR takes into account internal and external noise that may be affecting wireless data transmission, and is more reflective of the actual SNR of the wireless data connection than the estimated SNR. In order to calculate the derived SNR, the MCS number being used on the wireless connection is determined. For example, during at least high-level processing (e.g., PHY layer processing, etc.), the MCS number, being included in the received packets from the access point, may be automatically determined from the received packets. Once the MCS number is determined, then the SNR to MCS number mapping data (i.e., the MCS lookup table) is accessed and the SNR value associated with the determined MCS number is retrieved. This may be viewed as the derived SNR; for example, it is a derived estimate of what the wireless networking component determines the SNR of the connection to be under existing conditions (i.e., which takes internal and external noise into account).

Once at least two SNR values have been determined, then a new (e.g., revised) noise value may be determined 308. A comparison is made between the estimated SNR and the derived SNR. For example, a difference between the two values may be determined. In some embodiments, the absolute value of the difference is taken; for example, while it may be that the estimated SNR is higher than the derived SNR (e.g., the estimated SNR does not take external noise into account and is therefore higher), the reverse may also be true, as discussed further herein.

In an embodiment where estimated SNR is higher than the derived SNR, then the difference between the two values is determined and added to the initial noise value (e.g., the default noise floor). For example: $N_{revised}=N_{internal}+(SNR_{estimated}-SNR_{derived})$, where $N_{revised}$ is the "new" noise value that takes internal and external noise into account, $N_{internal}$ is the internal (e.g. default) noise value as described above, $SNR_{estimated}$ is the SNR determined based on the RSSI and default noise value, and $SNR_{derived}$ is the SNR determined by analyzing the MCS-SNR mapping data.

This revised noise value may then be used to decode messages as part of the wireless communication techniques. According to an embodiment, in order to use this revised noise value, a value must be written into the bias value register (as described above) or similar functionality. According to various embodiments, this is because the initial noise value is hard-coded into the wireless networking component; for example in the firmware, because the initial noise value was tested to reflect only the actual operating noise (i.e., thermal noise) under various configurations. Therefore, in an embodiment, a noise modifier value may be determined, which once written into the bias value register, or otherwise made available to the wireless networking component, may be used to modify the initial noise value so that the revised noise value is used in the appropriate calculations, such as in signal demodulation. For example, the noise modifier value may be determined as a difference between the initial noise value and the revised noise value, and then stored at the wireless networking component. Once the wireless networking component is to perform signal demodulation, the initial noise value is modified (e.g., added to) by the noise modifier value to result in the revised noise value being used in the signal processing (e.g., as part of an accurate SNR calculation). According to various embodiments, the SNR value determined by the wireless networking component may be directly edited, for example to reflect the revised noise value.

Figure 4:
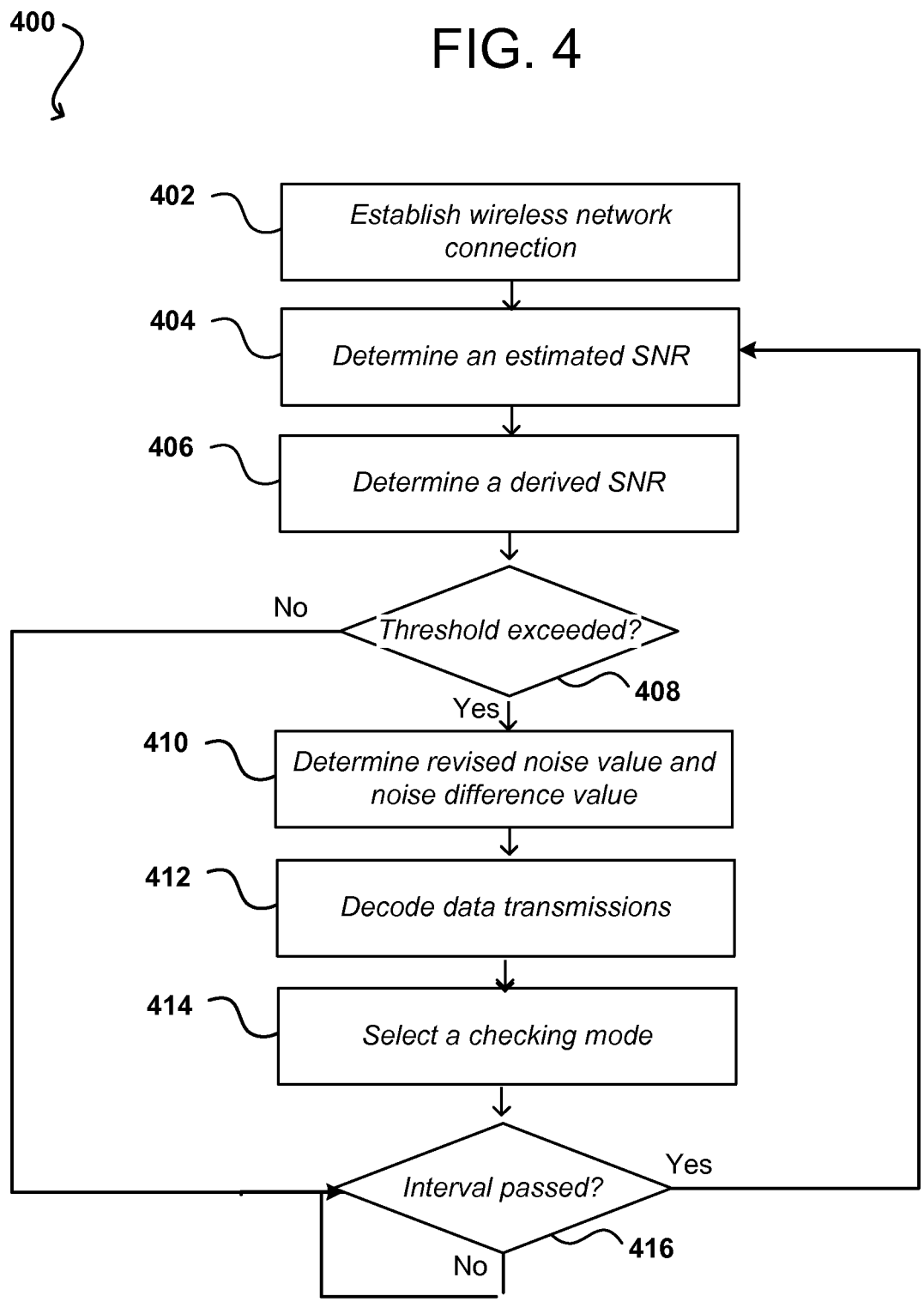
FIG. 4 illustrates another example process for determining noise levels used in decoding wireless transmissions, in accordance with various embodiments.

FIG. 4 illustrates another example 400 process for determining noise levels used in decoding wireless transmissions, in accordance with various embodiments. In this example, a wireless network connection is established 402 as in the example of FIG. 3, for example between a wireless networking component and a wireless access point. An estimated SNR is determined 404 as in the example of FIG. 3, for example based on the RSSI of the wireless connection and the default (e.g. initial) noise value as reported by the wireless networking component. According to an embodiment, and as described further herein, the techniques described herein may be repeated at an interval of varying length. For example, the entire process as described herein may be repeated every X number of milliseconds, where X is greater than one, or every Y number of received Wi-Fi packets, or using other criteria such as packet size, number of dropped packets, error rate, etc. In this case, the estimated SNR is calculated based on the default (e.g. initial) noise floor value provided in some embodiments by the wireless networking component. According to various embodiments, in the case of the first time through the approach the default noise value is used, while subsequent approaches utilize the last revised noise value. In other embodiments, the current noise value reported by the wireless networking component is used to determine the estimated SNR. This value may change over time; for example, if the signal power changes, then an automatic gain control configuration of the wireless networking component may change in response, which may result in the internal noise reported by the wireless networking component changing.

According to an embodiment, the estimated SNR may be determined by: $SNR_{estimate}=(RSSI-N_K)$, where N is the noise value and K is the number of times the process has been repeated, which could be per packet, loop iteration number, etc. For example, when K=0, then the default (e.g. initial) noise value reported by the wireless networking client is used. After one pass, then K is incremented, and when K=1, the revised noise value as determined in pass number 1 through the procedure is used in the determination of the estimated SNR, while in other embodiments, the noise value as currently reported in pass number K by the wireless networking component is used, and may be stored for later use, for example in the smoothing techniques described further herein.

According to an embodiment, a derived SNR is determined 406, for example by determining the MCS number associated with the wireless connection and analyzing the SNR to MCS mapping data in order to determine the derived SNR value. A determination is then made regarding whether the absolute value of a difference between the estimated SNR and the derived SNR exceeds a predetermined threshold 408. If not, then the process jumps to step 416, described further herein. If so, then the process continues at step 410. According to various embodiments, the threshold value may be user-provided or analytically determined based on various historical data and/or measurements associated with the wireless connection.

A revised noise value is determined 410, for example by adding the absolute value of the difference between the estimated SNR and the derived SNR to the noise value reported by the wireless networking component, or in some embodiments, a previously-determined noise value (e.g., $N_K$ in step 404 above). Using the revised noise value, a noise difference value is determined, for example by taking a difference of the noise value reported by the wireless networking component (e.g., $N_K$ where K=0) and the revised noise value (e.g., N(K+1)). In subsequent passes, the value of K will be incremented. The data transmissions are decoded 412, for example using the initial noise floor value and the noise difference value.

A checking mode is determined 414, for example based on the absolute value of the difference between the estimated SNR and the derived SNR, as utilized earlier in step 408. According to an embodiment, a plurality of checking modes are provided, wherein each checking mode corresponds to a particular time duration interval (e.g., 100 milliseconds) or a particular number of received packets, etc., although alternate embodiments are envisioned wherein additional or alternate criteria are associated with one or more checking modes. In an embodiment, a table or other data element is provided wherein an amount (or range of amounts) by which the absolute value of the difference between the estimated SNR and the derived SNR exceeds the threshold is associated with a particular checking mode (e.g., a particular time duration interval).

Once a time duration interval has been determined (e.g., by being associated with a particular checking mode), a check is made 416 whether the interval has passed. If so, then the process resumes at step 404; otherwise, the process continues to wait until the interval has passed. In this way, the frequency of the process may be modulated, thereby saving resources. If the absolute value of the difference between the estimated (e.g., inaccurate) SNR and the derived (e.g., accurate) SNR is small, or other factors indicate a consistent, stable noise value and/or lack of fluctuating external noise values, then a longer interval may be utilized before the process is renewed. If the difference is large, then the process may be repeated more frequently, until the difference has been minimized.

According to an embodiment, the time duration selected may be modified, for example by determining a rate of change or an amount of change corresponding to the difference between the estimated and revised SNR values, as calculated over one or more iterations of the process. In this embodiment, if the rate of change is large, then the process may need to be repeated more frequently until the rate of change declines, in which embodiment the time duration may be shortened, while if the rate of change is small, then the process may not need to be performed as frequently.

According to various embodiments, criteria other than time may be used in the checking mode(s). For example, the example interval of FIG. 4 may be performed per some number of packets received from an access point; for example, every packet or every $5^{th}$ packet. Other intervals could be packet size, either individual or total over some period, number of dropped packets, error rate, etc. In the example of performing the example of FIG. 4 for each packet, the revised noise value and noise difference value would be computed for each packet received and applied to that packet for purposes of demodulation and decoding, for example. In the example of every $5^{th}$ packet, step 416 would check whether 5 packets have been received since the last pass through the process, and if so, then perform the process for the next packet, or the packet just received. The number of packets used in the checking mode may change. For example, an initial value of "every 5 packets" may be used initially, while that value may change depending on various factors, such as In an embodiment, the disclosed techniques are performed on a system on a chip (SoC), which may not be able to identify received packets, in which case a time duration may be appropriate for the checking mode(s). In other embodiments wherein a component performing the disclosed techniques is able to monitor and analyze packets as they are received, packet and/or their characteristics (e.g., number, size, etc.) may be appropriate for the checking mode(s).

For example, an initial checking mode value may be for every 5th packet; i.e., for every 5th packet that is received, an estimated SNR and derived SNR will be determined for that packet, a threshold check made, and based on that, a revised noise value and noise difference value determined for the packet, and data transmissions in the packet and subsequent packets decoded based on those determined values. In various embodiments, more or fewer steps, or different steps may be implemented; e.g., no threshold check made. Then, as part of checking mode adjustment, it may be determined whether some selected values are changing such that the process should be performed more or less often. For example, the difference in the estimated SNR and the derived SNR may be determined over some duration of time or other interval. If the difference is increasing, then an adjustment may be made to the interval for the checking mode (or to the checking mode itself in various embodiments); e.g., the process being performed every $3^{rd}$ packet, or every $10^{th}$ packet, etc., based on the direction of the trend, and in some cases, attributes of the change such as magnitude, velocity, acceleration, outlier detection, etc.

Figure 5:
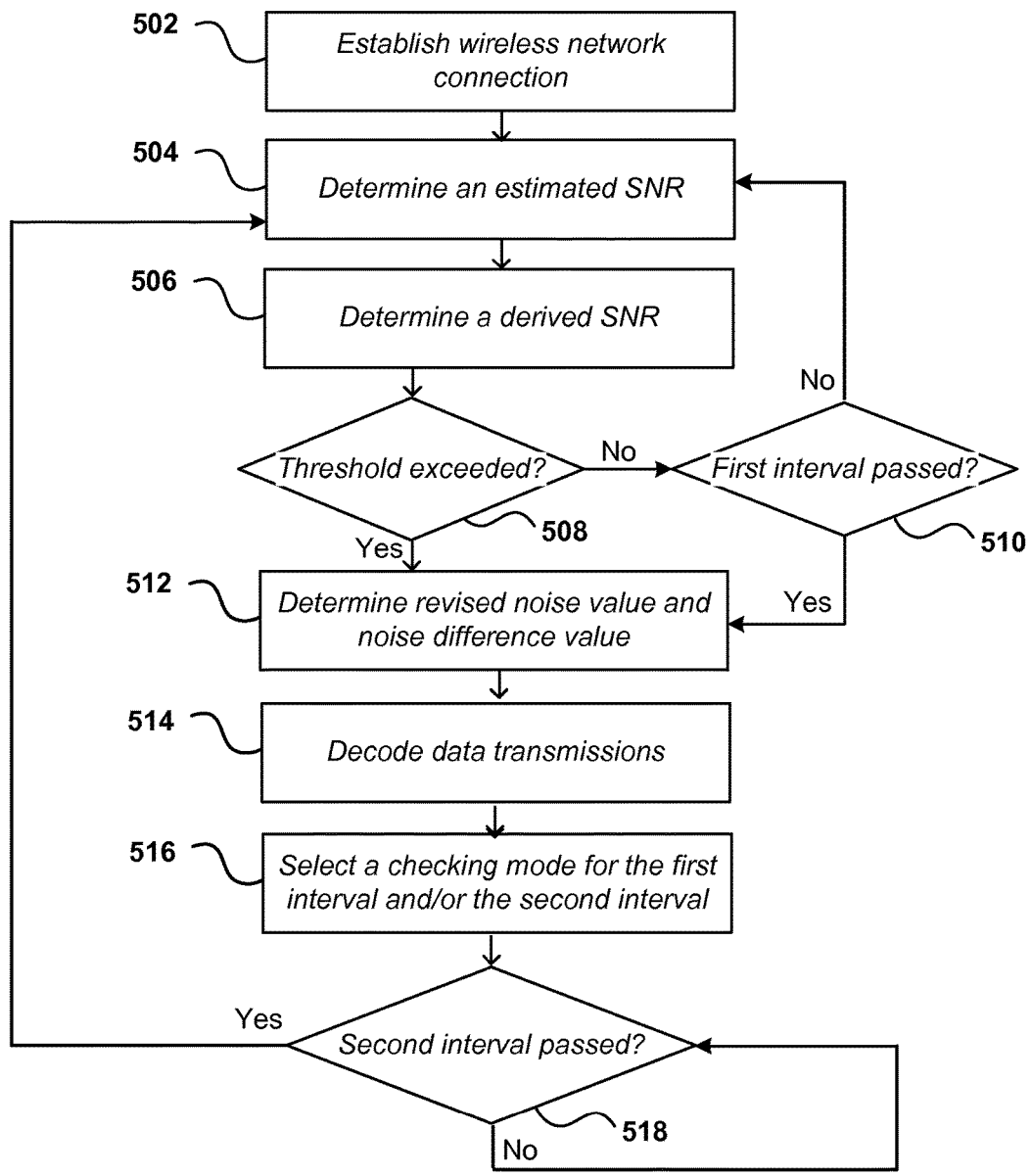
FIG. 5 illustrates another example process for determining noise levels used in decoding wireless transmissions, in accordance with various embodiments.

According to an embodiment, multiple intervals, with or without corresponding checking modes, and having similar or different techniques for calculating and/or adjusting the intervals, may be implemented. FIG. 5 illustrates another example 500 process for determining noise levels used in decoding wireless transmissions, in accordance with various embodiments. In this example, a wireless network connection is established 502, for example between a wireless networking component and a wireless access point. An estimated SNR for a packet is determined 504, for example based on the RSSI of the wireless connection and the default (e.g. initial) noise value as reported by the wireless networking component, and a derived SNR for the packet is determined 506, for example by determining the MCS number associated with the wireless connection and analyzing the SNR to MCS mapping data in order to determine the derived SNR value. A determination is then made regarding whether the absolute value of a difference between the estimated SNR and the derived SNR exceeds a predetermined threshold 508, although in some embodiments this determination may be omitted, or only performed every so often; e.g., based on various criteria, measurements, and/or intervals. If the threshold is exceeded, then the process continues at step 512. According to various embodiments, the threshold value may be user-provided or analytically determined based on various historical data and/or measurements associated with the wireless connection.

If the threshold is not exceeded, then a first interval check is made 510; for example, every X number of packets, then the example process in FIG. 5 will continue at step 512; otherwise, the example process proceeds to step 504. In various embodiments, the first interval may be based on number of packets (e.g., every $5^{th}$ packet), packet size, packet frequency, time, etc. Additionally, as discussed herein, the interval and/or the interval criteria may change over time based on various measurements or even at random. For example, the first interval may start at every $5^{th}$ packet, and then based on a determination, for example, that the difference between the estimated SNR and the derived SNR is increasing, the first interval may decrease to every 2 packets, or even every packet. In some embodiments, the interval criteria may change, or an additional criteria introduced, such that one time through the example process, the interval is every $5^{th}$ packet, but another time through the example process, the interval is every 5 milliseconds, or every X number of megabytes, etc., and another time through the example process, the interval is every $5^{th}$ packet and every 10 milliseconds, etc.

If the first interval is met, then the example process continues at step 512. A revised noise value is determined 512, for example by adding the absolute value of the difference between the estimated SNR and the derived SNR to the previously-determined noise value (e.g., $N_K$ in step 504 above). Using the revised noise value, a noise difference value is determined, for example by taking a difference of the initial noise value (e.g., $N_K$) and the revised noise value (e.g., $N_{(K+1)}$). In subsequent passes, the value of K will be incremented. The data transmissions are decoded 514, for example using the initial noise floor value and the noise difference value.

A checking mode is determined 516, for example based on the absolute value of the difference between the estimated SNR and the derived SNR. According to an embodiment, a plurality of checking modes are provided, wherein each checking mode corresponds to a second interval (e.g., 100 milliseconds, every $5^{th}$ packet, etc.). In an embodiment, a table or other data element is provided wherein an amount (or range of amounts) by which data (e.g., the absolute value of the difference between the estimated SNR and the derived SNR, how much the difference exceeds the threshold, etc.) is associated with a particular checking mode (e.g., a particular time duration interval, a particular interval of packets, etc.). In an embodiment, a checking mode may be determined for the first and second intervals or one of them, and this process may vary each time through the process. For example, a checking mode for the first interval may be selected, and on the next pass, a checking mode for the second interval may be selected, and so forth. The interval corresponding to the selected checking mode may take effect immediately, or may wait a certain number of passes through the process until taking effect.

A check is made 518 whether the second interval has passed. If so, then the process resumes at step 504; otherwise, the process continues to wait until the interval has passed. As discussed earlier, different criteria may be used for the first and second intervals, as well as the determination of whether the interval has passed may be performed by the same or different components of the underlying system.

According to various embodiments, smoothing or averaging techniques may be performed to determine values such as the revised noise value, for example by smoothing or averaging out historical noise difference values in order to account for swings in the revised noise value, for example brought about by rapid and/or volatile increases and/or decreases in the external noise (e.g., interference, channel changing, etc.). For example, when determining the $N_{revised} = N_{internal} + (SNR_{estimated} - SNR_{derived})$ as discussed above, for example per packet, for a packet [k+1], the value of the internal noise value $N_{internal}$ (e.g., reported by the wireless networking client, as described earlier) for the packet is determined: $N_{internal}$ [k+1]. It should be understood that any value or interval may be used in addition to, or instead of, per packet. Once $N_{internal}$ [k+1] is determined, then $N_{revised}$ may be determined by adding $N_{internal}$ [k+1] to a smoothed difference of $SNR_{estimated}$ and $SNR_{derived}$.

For example: $N_{revised}$ [k+1]=$N_{internal}$ [k+1]+($W_0$*($SNR_{estimated}$[k]−$SNR_{derived}$[k])+($W_1$*($SNR_{estimated}$[k−1]−$SNR_{derived}$[k−1])+ . . . +($W_{x-1}$*($SNR_{estimated}$ [k−(x+1)]−$SNR_{derived}$ [k−(x+1)])), where $W_0$, $W_1$, and $W_{x-1}$ comprise weighting factors and x−1 comprises the number of historical weighted values used in the determination. In an embodiment, the sum of the weighting factors $W_0$, $W_1$, and $W_{x-1}$ would equal one, and $W_0$ would be greater than $W_1$, $W_1$ would be greater than $W_2$, and so on. In one example, $W_0$ would be 1 and would be the only weighting (i.e., no additional historical values of $SNR_{estimated}$ or $SNR_{derived}$ would be considered). In an embodiment, x may be based on a need for historical smoothing. For example, if $N_{revised}$ is fluctuating wildly, then historical values may not be as useful and x may be smaller as a result. In another example, if $N_{revised}$ is stable, then x may be increased so that more historical noise values are taken into account.

Figure 6:
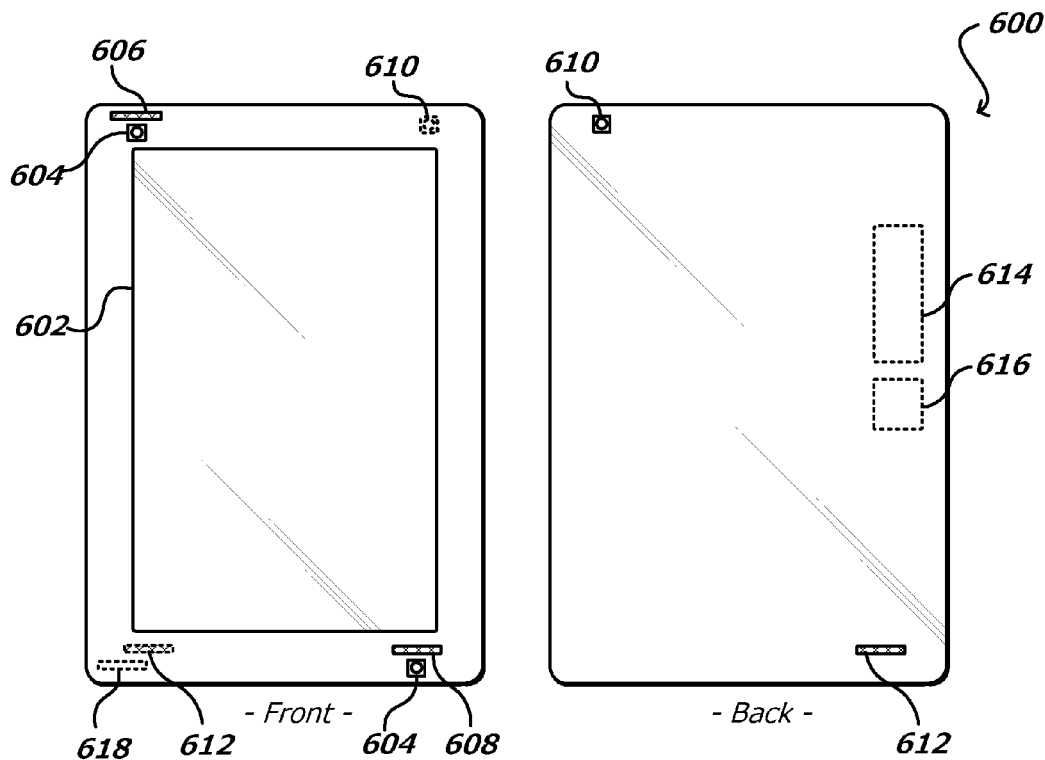
FIG. 6 illustrates front and back views of an example portable computing device that can be used in accordance with various embodiments.

FIG. 6 illustrates front and back views of an example electronic computing device 600 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen 602 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled device (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display element of the device). Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation- or position-determining elements 618 operable to provide information such as a position, direction, motion, or orientation of the device. These elements can include, for example, accelerometers, inertial sensors, electronic gyroscopes, and electronic compasses.

The example device also includes at least one communication mechanism 614, such as may include at least one wired or wireless component operable to communicate with one or more electronic devices. The device also includes a power system 616, such as may include a battery operable to be recharged through conventional plug-in approaches, or through other approaches such as capacitive charging through proximity with a power mat or other such device.

Various other elements and/or combinations are possible as well within the scope of various embodiments.

Figure 7:
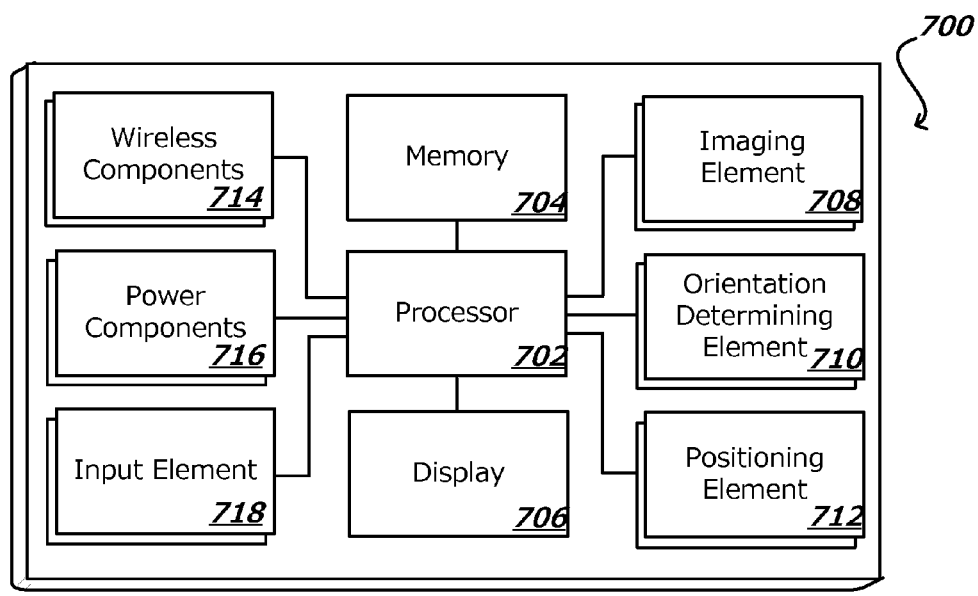
FIG. 7 illustrates an example set of basic components of a portable computing device, such as the device described with respect to FIG. 6.

FIG. 7 illustrates a set of basic components of an electronic computing device 700 such as the device 500 described with respect to FIG. 5. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices.

The device typically will include some type of display element 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 718 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
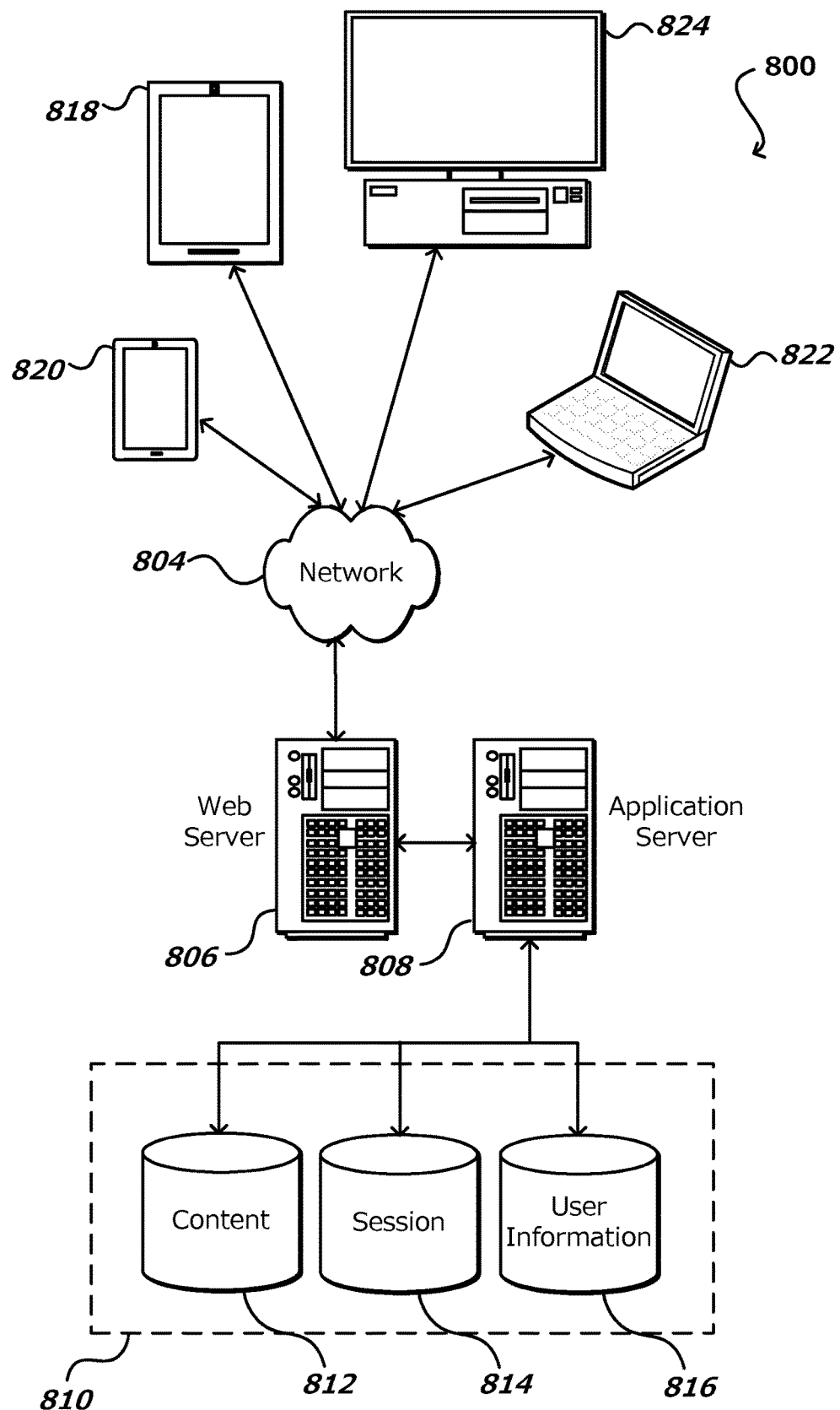
FIG. 8 illustrates an example of an environment for implementing aspects in accordance with various embodiments.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes electronic client devices 818, 820, 822, and 824, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client devices 818, 820, 822, and 824 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 818, 820, 822 and 824. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Various systems, devices, methods, and approaches described herein may be implemented on one or more general-purpose and/or specific computing devices, such as under the control of one or more computer systems configured with executable instructions, the computer systems for example having one or more processors which may be communicatively coupled to other components such as one or more memory units that may store the instructions for execution. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method, comprising:
   establishing, by a device having a wireless network component and a High-Definition Multimedia Interface (HDMI) component, a wireless network connection to a wireless access point, the wireless network component having a first noise value stored at the device, the first noise value corresponding to at least internal noise generated by the wireless network component;
   determining, by the device, an estimated signal-to-noise ratio (SNR) associated with the wireless network connection, the estimated SNR based on a comparison of a received signal strength indication (RSSI) value corresponding to the wireless network connection and the first noise value;
   determining, by the device, a modulation and coding scheme (MCS) number associated with the wireless network connection, the MCS number contained in a first packet received from the wireless access point;
   determining, by the device, a derived SNR of the wireless network connection, the derived SNR corresponding to the MCS number in mapping data stored at the device, the mapping data providing a correspondence between a list of SNR values and a list of MCS numbers;
   determining, by the device, a second noise value, the second noise value comprising the first noise value summed with an absolute value of a difference between the estimated SNR and the derived SNR;
   determining, by the device, a noise difference value substantially corresponding to noise generated by the HDMI component, the noise difference value comprising a difference between the second noise value and the first noise value;
   storing, at the device, the noise difference value;
   determining, by the device, a new SNR comprising a sum of the noise difference value and the first noise value;
   demodulating, at the device, the first packet to form a demodulated first packet; and
   communicating, by the device, the new SNR value and demodulated first packet to a decoder executing at the device.

2. The computer implemented method of claim 1, further comprising:
   determining that the absolute value of the difference between the estimated SNR and the derived SNR does not exceed a threshold value; and
   determining that a threshold number of packets have been received from the wireless access point,
   wherein receiving the first packet caused the threshold number of packets to be reached.

3. The computer implemented method of claim 2, further comprising:
   determining that the absolute value of the difference between the estimated SNR and the derived SNR is greater than a previous absolute value of a difference between a previous estimated SNR and a previous derived SNR; and
   decreasing, after communicating the new SNR value and demodulated first packet to a decoder executing at the device, the threshold number of packets to form a decreased threshold number of packets, the decreased threshold number of packets corresponding to a number of packets required to be received, and the decreased threshold number of packets used in a subsequent determination.

4. The computer implemented method of claim 1, further comprising:
   determining an increase in the internal noise, the increase caused by changes to gain control settings associated with a low-noise amplifier of the wireless network component;
   modifying the noise difference value, by adding a value corresponding to the increase in the internal noise to the noise difference value, to form a modified noise difference value; and
   demodulating the first packet based at least in part on the modified noise difference value and the first noise value.

5. A computer implemented method comprising:
   establishing, by a first device, a wireless network connection with a second device;
   determining, by the first device, a first signal-to-noise ratio (SNR) of the wireless network connection, the first SNR based at least in part on a first received signal strength indication (RSSI) value associated with the wireless network connection and a first noise value stored at the first device, the first noise value corresponding to at least internal noise associated with the first device;
   determining, by the first device, a second SNR, the second SNR based at least on a first modulation and coding scheme (MCS) number associated with the wireless network connection;
   determining, by the first device, a second noise value, the second noise value based at least on the first noise value and a difference between the first SNR and the second SNR;
   determining, by the first device, a noise difference value comprising a difference between the second noise value and the first noise value;
   determining, by the first device, a third SNR comprising a sum of the noise difference value and the first noise value; and
   decoding, by the first device, data transmissions received over the wireless network connection from the second device based at least in part on the third SNR.

6. The computer implemented method of claim 5, further comprising:
   determining, by the first device, a first noise modifier value, the first noise modifier value comprising a difference between the first noise value and the second noise value;
   storing, by the first device, the first noise modifier value at the first device; and
   modifying, by the first device, the first noise value by adding the first noise modifier value to the first noise value to generate the second noise value.

7. The computer implemented method of claim 6, further comprising:
   determining, by the first device, after a first predetermined interval of time has passed since decoding the data transmissions received from the second device and based at least in part on the second noise value, the third SNR of the wireless network connection, the third SNR based at least in part on a second RSSI value associated with the wireless network connection and the sum of the first noise value and the first noise modifier value;
   determining, by the first device, a fourth SNR, the fourth SNR based on a second MCS number associated with the wireless network connection;
   determining, by the first device, that a difference between the third SNR and the fourth SNR exceeds the difference between the first SNR and the second SNR;
   determining, by the first device, a third noise value, the third noise value based at least on the first noise value and a difference between the third SNR and the fourth SNR;
   determining, by the first device, a second noise modifier value, the second noise modifier value comprising a difference between the first noise value and the third noise value;
   storing, by the first device, the second noise modifier value at the device;
   decoding, by the first device, data transmissions from the second device based at least in part on a sum of the first noise value and the second noise modifier value; and
   determining, by the first device, a second predetermined interval of time to wait after decoding the data transmissions from the second device, based at least in part on a sum of the first noise value and the second noise modifier value, the second predetermined interval of time comprising an increase in the first predetermined period of time proportional to the amount by which the difference between the third SNR and the fourth SNR exceeds the difference between the first SNR and the second SNR.

8. The computer implemented method of claim 6, further comprising:
   determining, by the first device, the third SNR of the wireless network connection, the third SNR based at least in part on a second RSSI value associated with the wireless network connection and the first noise value;
   determining, by the first device, a fourth SNR, the fourth SNR based on a second MCS number associated with the wireless network connection; and
   determining, by the first device, a third noise value, the third noise value based at least on the first noise value and a weighted average of a difference between the third SNR and the fourth SNR and the difference between the first SNR and the second SNR,
   wherein a ratio of a first weight applied to the difference between the third SNR and the fourth SNR, and a second weight applied to the difference between the first SNR and the second SNR, corresponds to a ratio of the second SNR and the fourth SNR.

9. The computer implemented method of claim 6, further comprising:
   determining, by the first device, the third SNR of the wireless network connection, the third SNR based at least in part on a second RSSI value associated with the wireless network connection and the first noise value;
   determining, by the first device, a fourth SNR, the fourth SNR based on a second MCS number associated with the wireless network connection;
   determining, by the first device, that a difference between the third SNR and the fourth SNR does not exceed a threshold value;
   determining, by the first device, that a threshold number of packets have been received from the second device over the wireless network connection;
   determining, by the first device, a third noise value, the third noise value based at least on the first noise value and a difference between the third SNR and the fourth SNR;

determining, by the first device, a second noise modifier value, the second noise modifier value comprising a difference between the first noise value and the third noise value;

storing, by the first device, the second noise modifier value at the device;

decoding, by the first device, data transmissions from the second device based at least in part on a sum of the first noise value and the second noise modifier value; and modifying, by the first device, the threshold number of packets based at least in part on a difference between the second noise value and the third noise value.

10. The computer implemented method of claim 6, further comprising:

determining, by the first device, the third SNR of the wireless network connection, the third SNR based at least in part on a second RSSI value associated with the wireless network connection and the first noise value;

determining, by the first device, a fourth SNR, the fourth SNR based on a second MCS number associated with the wireless network connection;

determining, by the first device, that a threshold number of packets have been received from the second device over the wireless network connection;

determining, by the first device, a third noise value, the third noise value based at least on the first noise value and a difference between the third SNR and the fourth SNR;

determining, by the first device, a second noise modifier value, the second noise modifier value comprising a difference between the first noise value and the third noise value;

storing, by the first device, the second noise modifier value at the device;

decoding, by the first device, data transmissions from the second device based at least in part on a sum of the first noise value and the second noise modifier value;

determining, by the first device, that the difference between the third SNR and the fourth SNR is greater than the difference between the first SNR and the second SNR; and decreasing, by the first device, the threshold number of packets to be used in a subsequent determination, based at least in part on determining that the difference between the third SNR and the fourth SNR is greater than the difference between the first SNR and the second SNR.

11. The computer implemented method of claim 6, wherein the first noise modifier value corresponds to noise corresponding to operation of a wireless network component of the first device.

12. The computer implemented method of claim 6, further comprising:

determining, by the first device, an increase in the internal noise, the increase caused by changes to gain control settings associated with a low noise amplifier of the first device;

modifying, by the first device, the noise difference value, by adding a value corresponding to the increase in the internal noise to the noise difference value, to form a modified noise difference value; and decoding, by the first device, data transmissions received over the wireless network connection from the second device based at least in part on the modified noise difference value and the first noise value.

13. A device, comprising:
at least one processor;
a wireless network component; and
memory including instructions that, when executed by the processor, cause the computing device to:
establish a wireless network connection with a second device;
determine a first signal-to-noise ratio (SNR) of the wireless network connection, the first SNR based at least in part on a first received signal strength indication (RSSI) value associated with the wireless network connection and a first noise value stored at the device, the first noise value corresponding to at least internal noise associated with the device;
determine a second SNR, the second SNR based at least on a first modulation and coding scheme (MCS) number associated with the wireless network connection;
determine a second noise value, the second noise value based at least on the first noise value and a difference between the first SNR and the second SNR;
determine a noise difference value comprising a difference between the second noise value and the first noise value;
determine a third SNR comprising a sum of the noise difference value and the first noise value; and
decode data transmissions received over the wireless network connection from the second device based at least in part on the second noise value.

14. The device of claim 13, wherein the instructions, when executed, further cause the computing system to:
determine a first noise modifier value, the first noise modifier value comprising a difference between the first noise value and the second noise value;
store the first noise modifier value at the device; and
modify the first noise value by adding the first noise modifier value to the first noise value to generate the second noise value.

15. The device of claim 14, wherein the instructions, when executed, further cause the computing system to:
determine, after a first predetermined interval of time has passed since decoding the data transmissions received over the wireless network connection from the second device based at least in part on the second noise value, the third SNR of the wireless network connection, the third SNR based at least in part on a second RSSI value associated with the wireless network connection and the sum of the first noise value and the first noise modifier value;
determine a fourth SNR, the fourth SNR based on a second MCS number associated with the wireless network connection;
determine that a difference between the third SNR and the fourth SNR exceeds the difference between the first SNR and the second SNR;
determine a third noise value, the third noise value based at least on the first noise value and a difference between the third SNR and the fourth SNR;
determine a second noise modifier value, the second noise modifier value comprising a difference between the first noise value and the third noise value;
store the second noise modifier value at the device;
decode data transmissions from the second device based at least in part on a sum of the first noise value and the second noise modifier value; and
determine a second predetermined interval of time to wait after decoding the data transmissions from the second device based at least in part on a sum of the first noise value and the second noise modifier value, the second predetermined interval of time comprising an increase in the first predetermined period of time proportional to the amount by which the difference between the third SNR and the fourth SNR exceeds the difference between the first SNR and the second SNR.

16. The device of claim 14, wherein the instructions, when executed, further cause the computing system to:
    determine the third SNR of the wireless network connection, the third SNR based at least in part on a second RSSI value associated with the wireless network connection and the first noise value;
    determine a fourth SNR, the fourth SNR based on a second MCS number associated with the wireless network connection; and
    determine a third noise value, the third noise value based at least on the first noise value and a weighted average of a difference between the third SNR and the fourth SNR and the difference between the first SNR and the second SNR,
    wherein a ratio of a first weight applied to the difference between the third SNR and the fourth SNR, and a second weight applied to the difference between the first SNR and the second SNR, corresponds to a ratio of the second SNR and the fourth SNR.

17. The device of claim 14, wherein the instructions, when executed, further cause the computing system to:
    determine the third SNR of the wireless network connection, the third SNR based at least in part on a second RSSI value associated with the wireless network connection and the first noise value;
    determine a fourth SNR, the fourth SNR based on a second MCS number associated with the wireless network connection;
    determine that a difference between the third SNR and the fourth SNR does not exceed a threshold value;
    determine that a threshold number of packets have been received from the second device over the wireless network connection;
    determine a third noise value, the third noise value based at least on the first noise value and a difference between the third SNR and the fourth SNR;
    determine a second noise modifier value, the second noise modifier value comprising a difference between the first noise value and the third noise value;
    store the second noise modifier value at the device;
    decode data transmissions from the second device based at least in part on a sum of the first noise value and the second noise modifier value; and
    modify the threshold number of packets based at least in part on a difference between the second noise value and the third noise value.

18. The device of claim 14, wherein the instructions, when executed, further cause the computing system to:
    determine the third SNR of the wireless network connection, the third SNR based at least in part on a second RSSI value associated with the wireless network connection and the first noise value;
    determine a fourth SNR, the fourth SNR based on a second MCS number associated with the wireless network connection;
    determine that a threshold number of packets have been received from the second device over the wireless network connection;
    determine a third noise value, the third noise value based at least on the first noise value and a difference between the third SNR and the fourth SNR;
    determine a second noise modifier value, the second noise modifier value comprising a difference between the first noise value and the third noise value;
    store the second noise modifier value at the device;
    decode data transmissions from the second device based at least in part on a sum of the first noise value and the second noise modifier value;
    determine that the difference between the third SNR and the fourth SNR is greater than the difference between the first SNR and the second SNR; and
    decrease the threshold number of packets to be used in a subsequent determination, based at least in part on determining that the difference between the third SNR and the fourth SNR is greater than the difference between the first SNR and the second SNR.

19. The device of claim 14, wherein the first noise modifier value corresponds to noise corresponding to operation of the wireless network component.

20. The device of claim 14, wherein the instructions, when executed, further cause the computing system to:
    determine an increase in the internal noise, the increase caused by changes to gain control settings associated with a low noise amplifier of the first device;
    modify the first noise modifier value, by adding a value corresponding to the increase in the internal noise to the first noise difference value, to form a modified first noise modifier value; and
    decode data transmissions received over the wireless network connection from the second device based at least in part on the modified noise difference value and the first noise value.

* * * * *

UNITED STATES PATENT AND TRADEMARK OFFICE
CERTIFICATE OF CORRECTION

| | | |
|---|---|---|
| PATENT NO. | : 9,807,646 B1 | Page 1 of 1 |
| APPLICATION NO. | : 14/859971 | |
| DATED | : October 31, 2017 | |
| INVENTOR(S) | : Milos Jorgovanovic | |

It is certified that error appears in the above-identified patent and that said Letters Patent is hereby corrected as shown below:

On the Title Page

Item (72) Inventor: Change spelling of Inventor's last name to "Jorgovanovic"

Signed and Sealed this
Eighteenth Day of February, 2020

Andrei Iancu
*Director of the United States Patent and Trademark Office*